United States Patent [19]

Kanno et al.

[11] Patent Number: 5,434,235

[45] Date of Patent: Jul. 18, 1995

[54] PROCESS FOR THE PREPARATION OF (CO)POLYCARBONATE

[75] Inventors: Tatsuya Kanno; Yutaka Fukuda, both of Hyogo, Japan

[73] Assignee: Daicel Chemical Industries, Ltd., Osaka, Japan

[21] Appl. No.: 227,548

[22] Filed: Apr. 14, 1994

[51] Int. Cl.⁶ ............................................. C08G 64/00
[52] U.S. Cl. .................................. 528/198; 528/196; 528/199
[58] Field of Search ....................... 528/196, 198, 199

[56] References Cited

FOREIGN PATENT DOCUMENTS

| | | |
|---|---|---|
| 0351168 | 1/1990 | European Pat. Off. . |
| 0360578 | 3/1990 | European Pat. Off. . |
| 0501374 | 9/1992 | European Pat. Off. . |
| 0583936 | 2/1994 | European Pat. Off. . |
| 0584801 | 3/1994 | European Pat. Off. . |
| 0592900 | 4/1994 | European Pat. Off. . |
| 676977 | 8/1966 | France . |
| 63-182336 | 7/1988 | Japan . |
| 4-100824 | 4/1992 | Japan . |

*Primary Examiner*—James J. Seidleck
*Assistant Examiner*—Terressa Mosley
*Attorney, Agent, or Firm*—Flynn, Thiel, Boutell & Tanis

[57] ABSTRACT

A process for the preparation of a substantially chlorine-free, high-molecular-weight, colorless and transparent (co)polycarbonate by melt-polycondensing a dihydroxy compound with a carbonic diester, which comprises using a carbonic diester which satisfies at lease one factor selected from the group consisting of:

(factor-1) the carbonic diester is substantially free from phenyl salicylate, o-phenoxybenzoic acid and phenyl o-phenoxybenzoate, (factor-2) the carbonic diester is substantially free from tin ion, and (factor-3) the carbonic diester is substantially free from methyl phenyl carbonate.

15 Claims, No Drawings

PROCESS FOR THE PREPARATION OF (CO)POLYCARBONATE

BACKGROUND OF THE INVENTION

1. Field of the Invention

The present invention relates to a process for the preparation of a discoloration-free, high-molecular weight (co)polycarbonate which comprises melt-polycondensing a dihydroxy compound with a carbonic diester containing specific impurities in reduced amounts through transesterification. Particularly, the present invention relates to a process for the preparation of a discoloration-free, high-molecular weight (co)polycarbonate which comprises melt-polycondensing a dihydroxy compound with a carbonic diester containing specific impurities in reduced amounts through transesterification in the presence of (a) a nitrogen-containing basic compound and/or (b) an alkali metal compound and/or an alkaline earth metal compound as a catalyst(s).

2. Description of the Related Art

Although a discoloration-free, high-molecular weight polycarbonate is a general-purpose engineering thermoplastic which is useful in various fields, particularly as injection molding material or sheet material substituting for a window pane, the processes for the preparation thereof according to the prior art has various problems.

The interfacial polycondensation process is generally effective in preparing a polycarbonate, but has disadvantages that the use of toxic phosgene is necessitated and that the formed polycarbonate is contaminated with residual chlorine ion.

In order to overcome these disadvantages, Japanese Patent Publication-A No. 63-182336 (published on Jul. 27, 1988) discloses a process for the preparation of a polycarbonate which comprises using liquid trichloromethyl chloroformate, which is a dimer of phosgene, instead of the toxic phosgene and polycondensing it with a special dihydric phenol by the interfacial process.

However, this patent document does not give any specific information about the special dihydric phenol with the exception of 9,9-bis(4-hydroxyphenyl)fluorenes. Further, although Angew. Chem. 99, p.p. 922-923 (1987) (by H. Eckert and B. Forster; "Triphosgen ein Kristalliner Phosgen-Ersatz") describes that a polycarbonate is prepared from 2,2-bis(4-hydroxyphenyl)propane by using triphosgene instead of the toxic phosgene, a reaction mechanism wherein phosgene is generated is also described therein.

Further, it is proposed in Japanese Patent Publication-A No. 4-100824 (published on Apr. 4, 1992) to use a diaryl carbonate having a xanthone content of 10 ppm or below. Although the use of such a carbonate can give a relatively light-colored polycarbonate, it has a problem that the obtained polycarbonate somewhat yellows as compared with that prepared by the phosgene process.

Furthermore, a process for the preparation of a polycarbonate using a catalyst system comprising a combination of a nitrogen-containing basic compound with a boron compound is proposed, for example, in U.S. Pat. No. 4,590,257 (date of patent: May 20, 1986, assignee: General Electric Co.). Although this process can give a relatively light-colored polycarbonate in spite of the poor activity of the catalyst on the polymerization, the process has problems that it takes a long time to complete the polymerization because of the low activity of the catalyst on the polymerization which results in low industrial productivity and not only a side reaction liable to occur during the polymerization to form a branched structure, but also the obtained polycarbonate is poor in heat stability. In addition to the U.S. Pat. No. 4,590,257 described above, U.S. Pat. Nos. 3,442,854 (assignee: FARBENFAB BAYER AG) and 5,276,109 (assignee: GENERAL ELECTRIC CO.; date of patent: Jan. 4, 1994), and European Patent Publication-A Nos. 351168 (published on Jan. 17, 1990) and 435124 (published on Jul. 3, 1991) disclose that a boron compound such as boric acid and triphenylborate is useful to prevent the discoloration of the polycarbonate.

DISCLOSURE OF THE INVENTION

SUMMARY OF THE INVENTION

The present inventors have extensively studied to solve the above problems and have found that a discoloration-free, high-molecular weight polycarbonate can be prepared without using toxic phosgene by melt-polycondensing a dihydroxy compound with a carbonic diester containing specific impurities in reduced amounts through transesterification in the presence of (a) a nitrogen-containing basic compound and/or (b) an alkali metal compound and/or an alkaline earth metal compound as a catalyst(s).

Thus, the present invention relates to a process for the preparation of a (co)polycarbonate by melt-polycondensing a dihydroxy compound with a carbonic diester, which comprises using a carbonic diester which satisfies at least one factor selected from the group consisting of:

(factor-1) the carbonic diester is substantially free from phenyl salicylate, o-phenoxybenzoic acid and phenyl o-phenoxybenzoate, (factor-2) the carbonic diester is substantially free from tin ion, and (factor-3) the carbonic diester is substantially free from methyl phenyl carbonate.

The carbonic diester satisfies preferably at least two factors among the above factors 1, 2 and 3.

The carbonic diester contains advantageously (1) copper ion in an amount of 1 ppm or below and phosphorus ion in an amount of 20 ppm or below, (2) water in an amount of 0.3% by weight or below, chlorine in an amount of 5 ppm or below, sodium ion in an amount of 1 ppm or below and iron ion in an amount of 1 ppm or below, (3) water in an amount of 0.3% by weight or below, chlorine in an amount of from above 3 to 5 ppm, sodium ion in an amount of 1 ppm or below and iron ion in an amount of 1 ppm or below, (4) water in an amount of 0.3% by weight or below, chlorine in an amount of from 3.3 to 5 ppm, sodium ion in an amount of 1 ppm or below and iron ion in an amount of 1 ppm or below, or (5) water in an amount of 0.3% by weight or below, chlorine in an amount of from above 4 to 5 ppm, sodium ion in an amount of 1 ppm or below and iron ion in an amount of 1 ppm or below.

Although the catalyst to be used in the above process is not limited, it is recommended to use (a) a catalyst selected from among nitrogen-containing basic compounds and/or (b) a catalyst selected from among alkali metal compounds and alkaline earth metal compounds.

In the process according to the present invention, at least one compound selected from the group consisting of a boric acid, a borate and ammonium hydrogenphosphite is advantageously used as an acidic substance. The boric acid is preferably orthoboric acid.

In the present invention, the term "(co)polycarbonate" includes polycarbonate (homopolymer), copolycarbonate (copolymer) and copolyester carbonate (copolymer).

The factor-1 means that the carbonic diester contains 50 ppm or below of a sum of phenyl salicylate, o-phenoxybenzoic acid and phenyl o-phenoxybenzoate. The factor-2 means that the carbonic diester contains 5 ppm or below of tin ion. The factor-3 means that the carbonic diester contains 50 ppm or below of methyl phenyl carbonate.

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Representative examples of the dihydroxy compound to be used in the present invention include those represented by the following general formulae (I) to (IV):

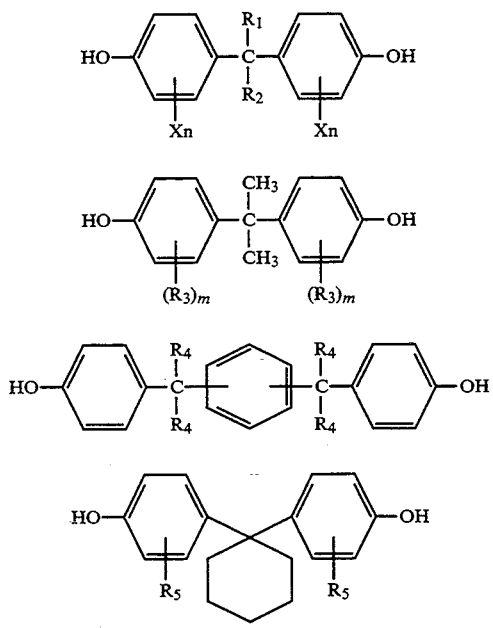

wherein $R_1$, $R_2$, $R_3$, $R_4$ and $R_5$ are each a hydrogen atom, a linear or branched alkyl group having 1 to 8 carbon atoms or a phenyl group; X is a halogen atom; n is 0 or an integer of 1 to 4 and m is an integer of 1 to 4.

Examples of the bisphenol, that is the dihydroxy compound, represented by the formula (I) include 2,2-bis(4-hydroxyphenyl)propane, 2,2-bis(4-hydroxyphenyl)butane, 2,2-bis(4-hydroxyphenyl)-4-methylpentane, 2,2-bis(4-hydroxyphenyl)octane, 4,4'-dihydroxy-2,2,2-triphenylethane and 2,2-bis(3,5-dibromo-4-hydroxyphenyl)propane.

Examples of the bisphenol represented by the formula (II) include 2,2-bis(4-hydroxy-3-methylphenyl)propane, 2,2-bis(4-hydroxy-3-isopropylphenyl)propane, 2,2-bis(4-hydroxy-3-sec-butylphenyl)propane, 2,2-bis(3,5-dimethyl-4-hydroxyphenyl)propane and 2,2-bis(4-hydroxy-3-t-butylphenyl)propane.

Examples of the bisphenol represented by the formula (III) include 1,1'-bis(4-hydroxyphenyl)-p-diisopropylbenzene and 1,1'-bis(4-hydroxyphenyl)-m-diisopropylbenzene.

The bisphenol represented by the formula (IV) includes 1,1-bis(4-hydroxyphenyl)cyclohexane.

Further, a copolycarbonate can be prepared by using two or more dihydroxy compounds selected from among those represented by the formulae (I) to (IV).

Representative examples of the carbonic diester to be used in the present invention include diphenyl carbonate, ditolyl carbonate, bis(chlorophenyl) carbonate, m-cresyl carbonate, dinaphthyl carbonate, bis(biphenyl) carbonate, diethyl carbonate, dimethyl carbonate, dibutyl carbonate and dicyclohexyl carbonate, among which diphenyl carbonate is particularly preferable.

In the present invention, one or more carbonic diester(s) is(are) used as a monomer(s). Alternatively, a combined use of the carbonic diester with a dicarboxylic acid ester and/or a dicarboxylic acid is suitable in the present invention. Examples of the dicarboxylic acid ester include diphenyl terephthalate and diphenyl isophthalate. Examples of the dicarboxylic acid include terephthalic acid and isophthalic acid. In this case, the amount of the sum of the dicarboxylic acid ester and the dicarboxylic acid is 50 mole % or below based on the sum of the amounts of the carbonic diester, the dicarboxylic acid and the dicarboxylic acid ester, and a copolyester carbonate is obtained by melt-polycondensation. Namely, in the present invention, the term "carbonic diester" includes generally the dicarboxylic acid (ester), too. When two or more carbonic diester are used, a copolymer is obtained.

The carbonic diester to be used in the present invention must satisfy at least one factor selected from the group consisting of:

(factor-1) the carbonic diester is substantially free from phenyl salicylate, o-phenoxybenzoic acid and phenyl o-phenoxybenzoate, (factor-2) the carbonic diester is substantially free from tin ion, and (factor-3) the carbonic diester is substantially free from methyl phenyl carbonate.

That is, the carbonic diester contains 50 ppm or below of a sum of phenyl salicylate, o-phenoxybenzoic acid and phenyl o-phenoxybenzoate, 5 ppm or below of tin ion, and/or, 50 ppm or below of methyl phenyl carbonate.

The impurities described above affect the hue and heat-resistance of the resulting (co)polycarbonate.

Preferred examples of the carbonic diester to be used in the present invention include (1) those containing copper ion in an amount of 1 ppm or below and phosphorus ion in an amount of 20 ppm or below, (2) those containing water in an amount of 0.3% by weight or below, chlorine in an amount of 5 ppm or below, sodium ion in an amount of 1 ppm or below and iron ion in an amount of 1 ppm or below, (3) those containing water in an amount of 0.3% by weight or below, chlorine in an amount of from above 3 to 5 ppm, sodium ion in an amount of 1 ppm or below and iron ion in an amount of 1 ppm or below, (4) those containing water in an amount of 0.3% by weight or below, chlorine in an amount of from 3.3 to 5 ppm, sodium ion in an amount of 1 ppm or below and iron ion in an amount of 1 ppm or below, and (5) those containing water in an amount of 0.3% by weight or below, chlorine in an amount of from above 4 to 5 ppm, sodium ion in an amount of 1 ppm or below and iron ion in an amount of 1 ppm or below. When a carbonic diester not satisfying these requirements other than the water content is used, the resulting (co)polycarbonate may be significantly discolored and have poor properties, particularly in heat stability. When the carbonic diester has a water content exceeding 0.3% by weight, the diester is hydrolyzed during the reaction to lose the molar balance of monomers, so that no polymer having a high degree of polymerization is formed.

In the present invention, the chlorine which contributes the chlorine content includes free chlorine ions, chlorines present in the form of an acid such as hydrochloric acid, chlorines present in the form of an inorganic salt such as sodium chloride and potassium chloride and chlorines present in the form of an organic chlorine compound such as phenyl chloroformate. The chlorine content is determined by ion chromatography.

The removal of the above impurities from the carbonic diester can be conducted by, e.g., (1) a process which comprises washing a carbonic diester with hot water or an aqueous weak-base solution, (2) a process which comprises adding urea to a carbonic diester and heat-melting the obtained mixture, or (3) a process which comprises adding a salt of an alkali or alkaline earth metal, for example, $Na_2CO_3$, $NaHCO_3$, $KH_2PO_4$ or $K_2HPO_4$, to a carbonic diester and distilling the obtained mixture in a vacuum.

The methods for measuring the impurities in the carbonic diester are described with respect to Examples of the present invention hereinafter.

The necessary amount of the carbonic diester is equimolar with that of the dihydroxy compound. Generally, a carbonic diester must be reacted with a dihydroxy compound at a molar ratio of 1:1 in order to form a high-molecular weight (co)polycarbonate. When bisphenyl carbonate is used as a carbonic diester, two mol of phenol is formed by the reaction of bisphenyl carbonate with the dihydroxy compound. The phenol is distilled off from the reaction system. In the present invention, the carbonic diester is preferably used in an amount of 1.01 to 1.5 mol, still preferably 1.015 to 1.20 mol per mol of the dihydroxy compound, for the purpose of improving the physical properties of the resulting (co)polycarbonate, particularly for lowering the terminal hydroxyl concentration of the resulting (co)polycarbonate as much as possible to thereby get rid of an adverse effect on the hue thereof.

The terminal hydroxyl concentration of the (co)polycarbonate obtained according to the present invention is in the range of preferably 3 to 70 mole %, still preferably 3 to 50 mole %, and particularly preferably 3 to 30 mole %. It is practically difficult to realize a terminal hydroxyl concentration of less than 3 mole %. On the countrary, when it exceeds 30 mole %, the resulting (co)polycarbonate is significantly discolored, and when it exceeds 50 mole %, the heat stability of the (co)polycarbonate is also impaired. A (co)polycarbonate having a terminal hydroxyl concentration of 3 to 50 mole % can be used singly. A (co)polycarbonate having a terminal hydroxyl concentration of above 50 to 70 mole % can be used in the form of a blend with another polymer.

To lower the teminal hydroxyl concentration of a resulting (co)polycarbonate, a carbonic diester, an ester compound or a phenol may be added to the reaction system as a terminal-blocking agent. The blocking agent is used in an amount of preferably 0.05 to 10 mole %, still preferably 1 to 5 mole %, based on the dihydroxy compound. Thus, the carbonic diester is used as a monomer and as a blocking agent. Accordingly, the amount of the carbonic diester affects the teminal hydroxyl concentration of a resulting (co)polycarbonate.

In the present invention, the melt polycondensation of a dihydroxy compound with a carbonic diester is conducted preferably in the presence of (a) a nitrogen-containing basic compound and/or (b) an alkali metal compound and/or an alkaline earth metal compound, still preferably in the presence of a nitrogen-containing basic compound and, optionally, an alkali metal compound or an alkaline earth metal compound as a catalyst(s).

Representative examples of the nitrogen-containing basic compound usable in the present invention include alkyl-, aryl- and alkylarylammonium hydroxides such as tetramethylammonium hydroxide ($Me_4NOH$), tetraethylammonium hydroxide ($Et_4NOH$), tetrabutylammonium hydroxide ($Bu_4NOH$) and trimethylbenzylammonium hydroxide ($C_6H_5—CH_2(Me)_3NOH$); tertiary amines such as trimethylamine, triethylamine, dimethylbenzylamine and triphenylamine; secondary amines represented by the formula: $R_2NH$ (wherein R is an alkyl group such as a methyl or ethyl group or an aryl group such as a phenyl or tolyl group); primary amines represented by the formula: $RNH_2$ (wherein R is as defined above); ammonia; and basic salts such as tetramethylammonium borohydride ($Me_4NBH_4$), tetrabutylammonium borohydride ($Bu_4NBH_4$), tetrabutylammonium tetraphenylborate ($Bu_4NBPh_4$) and tetramethylammonium tetraphenylborate ($Mu_4NBPh_4$).

Other examples of the nitrogen-containing basic compound include 4-(4-methyl-1-piperidinyl)pyridine, 4-dimethylaminopyridine, 4-diethylaminopyridine, 4-pyrrolidinopyridine, 4-aminopyridine, 2-aminopyridine, 2-hydroxypyridine, 2-methoxypyridine, 4-methoxypyridine, 4-hydroxypyridine, 2-dimethylaminoimidazole, 2-methoxyimidazole, 2-mercaptoimidazole, aminoquinoline, benzimidazole, imidazole, 2-methylimidazole, 4-methylimidazole, diazabicyclooctane (DABCO), 1,8-diazabicyclo[5.4.0]-7-undecene (DBU) and 4-(4-methylpyrrolidinyl)pyridine.

Representative examples of the alkali metal compound include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borate, lithium borate, potassium borate, sodium borohydride, lithium borohydride, potassium borohydride, sodium borophenylate, sodium benzoate, potassium benzoate, lithium benzoate, disodium hydrogenphosphate, dipotassium hydrogenphosphate, dilithium hydrogenphosphate, disodium, dipotassium and dilithium salts of bisphenol A, and sodium, potassium and lithium salts of phenol, among which lithium borate, potassium borate and potassium acetate are preferable.

Representative examples of the alkaline earth metal compound include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, barium carbonate, magnesium acetate, strontium acetate, calcium stearate, barium stearate, magnesium stearate and strontium stearate.

Preferred examples of the alkali metal compound and the alkaline earth metal compound include borates of alkali metal compounds and borates of alkaline earth metal compound.

The amount of the nitrogen-containing basic compound to be used as a catalyst must range from $10^{-6}$ to $10^{-1}$ mol, preferably from $10^4$ to $10^{-2}$ mol, per mol of the dihydroxy compound fed in the reaction system. If the amount is less than $10^{-6}$ mol, the catalytic activity is poor and results in slow polycondensation, while if it exceeds $10^{-1}$ mol, the obtained (co)polycarbonate is significantly contaminated with the catalyst to result in poor properties.

The total amount of the alkali metal compound and the alkaline earth metal compound to be used as a catalyst(s) must be within the range of $10^{-7}$ to $10^{-2}$ mol, preferably $10^{-5}$ to $10^{-3}$ mol, per mol of the dihydroxy compound fed in the reaction system. When the amount is less than $10^{-7}$ mol, the catalytic activity is too poor to obtain a (co)polycarbonate having a desired degree of polymerization while when it exceeds $10^{-2}$ mol, the resulting (co)polycarbonate is significantly contaminated with the co-catalyst to result in poor properties.

When one catalyst is used, it may be fed into a reactor with the feeding of the monomers or stepwise in the course of the reaction. When two or more catalysts are used, they may be added simultaneously with the feeding of the monomers or stepwise in the course of the reaction.

The melt-polycondensation is preferably effected in the presence of, further, at least one compound selected from the group consisting of a boric acid, a borate and ammonium hydrogenphosphite as an acidic substance.

The boric acid as the acidic substance include metaboric acid, orthoboric acid, tetraboric acid and so forth. Among them, orthoboric acid is preferred. Representative examples of the borate as the acidic substance include triphenyl borate, trimethyl borate, triethyl borate, butyl borate and tritolyl borate. Further, ammonium hydrogenphosphite is also used as the acidic substance.

The acidic substance may be added in the early stage of the reaction, in the middle stage of the reaction or after the completion thereof, and is preferably added in the early stage of the reaction. The acidic substance added neutralizes the basic polymerization catalyst, serving to improve the heat stability of the (co)polycarbonate.

The acidic substance is used in an amount of 0.01 to 500 mol, preferably 0.01 to 10 mol, based on 1 mol of the basic polymerization catalyst. When the amount is less than 0.01 mol, the resulting (co)polycarbonate will be little improved in heat stability, while when it exceeds 500 mol, the resulting (co)polycarbonate will have too low a degree of polymerization unfavorably.

The boric acid or borate is used in such amount that the amount of the boron atom of the boric acid or borate is 0.01 to 500 mol, preferably 0.01 to 10 mol, based on 1 mol of the basic group of the nitrogen-containing basic compound as the catalyst. The boric acid or borate is used in such amount that the amount of the boron atom of the boric acid or borate is 0.01 to 500 mol, preferably 5 to 200 mol, based on 1 mol of the alkali metal or alkaline earth metal atom of the alkali metal or alkaline earth metal compound as the catalyst. The boric acid or borate is used in such amount that the amount of the boron atom of the boric acid or borate is 0.01 to 500 mol based on 1 mol of the sum of the basic group of the nitrogen-containing basic compound and the alkali metal or alkaline earth metal atom of the alkali metal or alkaline earth metal compound.

The ammonium hydrogenphosphite is used as an acidic substance in such amount that the amount of the phosphorus atom of the ammonium hydrogenphosphite is 0.01 to 500 mol based on 1 mol of the basic group of the nitrogen-containing basic compound as the catalyst. The ammonium hydrogenphosphite is used in such amount that the amount of the phosphorus atom of the ammonium hydrogenphosphite is 0.01 to 500 mol based on 1 mol of the alkali metal or alkaline earth metal atom of the alkali metal or alkaline earth metal compound as the catalyst. The ammonium hydrogenphosphite is used in such amount that the amount of the phosphorus atom of the ammonium hydrogenphosphite is 0.01 to 500 mol based on 1 mol of the sum of the basic group of the nitrogen-containing basic compound and the alkali metal or alkaline earth metal atom of the alkali metal or alkaline earth metal compound.

In the process according to the present invention, the melt-polycondensation can proceed at a temperature ranging from 100° to about 300° C. The reaction temperature is preferably from 130° to 280° C. When the reaction temperature is lower than 100° C., the reaction is too slow, while when it exceeds 300° C., a side reaction is liable to occur.

According to the present invention, a substantially chlorine-free, high-molecular weight, colorless and transparent (co)polycarbonate can be prepared without using toxic phosgene by using a raw material containing few specific impurities and, as a catalyst system, (a) a nitrogen-containing basic compound and/or (b) an alkali metal compound and/or an alkaline earth metal compound.

EXAMPLES

The present invention will now be described in more detail with reference to the following Examples which should not be considered to limit the scope of the present invention.

Various values shown in the following Examples were determined as follows:

(1) Viscosity-average molecular weight (Mv)

The viscosity-average molecular weight (Mv) of the (co)polycarbonate was determined by calculation based on the intrinsic viscosity number $[\eta]$ of a methylene chloride solution of each reaction mixture comprising mainly a (co)polycarbonate as determined at 20° C. with an Ubbellohde viscometer according to the following formula:

$$[\eta] = 1.11 \times 10^{-4} (Mv)^{0.82}$$

(2) Glass transition point

The glass transition point of the (co)polycarbonate was measured with the use of a differential scanning calorimeter (Perkin-Elmer 2C).

(3) Terminal hydroxyl concentration

The terminal hydroxyl concentration of the (co)polycarbonate was determined by subjecting each reaction mixture comprising mainly a (co)polycarbonate to $^{13}$C-

NMR spectroscopy according to the gated decoupling measurement mode and calculating the area ratio of the peak at 114.80 ppm to that at 129.50 ppm.

(4) Hue

The hue of each reaction mixture comprising mainly a (co)polycarbonate was evaluated by the naked eye.

(5) Impurity contents a) Method for determining phenyl salicylate, o-phenoxybenzoic acid and phenyl o-phenoxybenzoate content, or methyl phenyl carbonate content The content was determined by the use of a gas chromatograph (mfd. by Shimadzu Corporation, GC-14A).

b) Method for determining tin ion content

The content was determined with an atomic absorption spectrometer (mfd. by Shimadzu Corporation, AA-670 G) and a graphite furnaced analyzer (mfd. by Shimadzu Corporation, GFA-4A).

c) Method for determining chlorine content

A sample (5 g) was dissolved in 10 ml of toluene, followed by the addition of 10 ml of an eluent (an aqueous solution containing 2.8 mmol of $NaHCO_3$ and 2.25 mmol of $Na_2CO_3$) and 15 ml of highly deionized water in this order. The obtained mixture was shaken and then left to stand. The upper toluene layer formed was removed. The resulting aqueous phase was treated with C-18 SEP-PAK to be freed from contaminant toluene. The aqueous phase thus treated was subjected to ion chromatography (YOKOGAWA SAX-1) to determine the chlorine content.

d) Method for determining sodium ion content or iron ion content

The content was determined with an atomic absorption spectrometer (SAS-727 mfd. by Seiko Instruments, Inc.).

e) Method for determining copper ion content or phosphorus ion content

The content was determined with an inductively coupled plasma (ICP) emission spectrometer (mfd. by Shimadzu Corporation, ICPS-1000III).

f) Method for determining water content

The content was determined with a trace water measuring apparatus (mfd. by Mitsubishi Chemical Industries Ltd., CA-05).

(6) Storage stability

The YI of each sheet [50×50×2 mm (H-W-D)] prepared with each reaction mixture comprising mainly a (co)polycarbonate by the hot pressing quenching process was determined on a color difference meter (mfd. by Nippon Denshoku, 300A) before and after storage at 160° C. for 720 hours.

EXAMPLE 1

22.8 g (0.1 mol) of 2,2-bis(4-hydroxyphenyl)propane (BPA), 0.00244 g ($2\times10^{-4}$ mol per mol of BPA) of 4-dimethylaminopyridine and 21.96 g (0.1025 mol) of diphenyl carbonate having impurity contents given in Table 1 were fed into a reactor and stirred together in a nitrogen atmosphere at 180° C. for one hour. The temperature of the resulting mixture was raised while gradually evacuating the reaction system. Finally, the mixture was polycondensed at 270° C. in a vacuum of 0.1 Torr for one hour, with the removal of formed phenol by distillation. Thus, a reaction mixture comprising mainly a polycarbonate was obtained.

EXAMPLE 2

Another polycarbonate was prepared through polycondensation in the same manner as that of Example 1 except that 0.000086 g ($1\times10^{-5}$ mol per mol of BPA) of lithium metaborate dihydrate was used instead of the 4-dimethylaminopyridine and that 0.001 g ($1.6\times10^{-4}$ mol per mol of BPA) of boric acid was further added.

EXAMPLE 3

Another polycarbonate was prepared through polycondensation in the same manner as that of Example 1 except that a catalyst system comprising 0.00122 g ($1\times10^{-4}$ mol per mol of BPA) of 4-dimethylaminopyridine and 0.000033 g ($5\times10^{-6}$ mol per mol of BPA) of lithium acetate was used instead of the 4-dimethylaminopyridine.

EXAMPLE 4

11.4 g (0.05 mol) of 2,2-bis(4-hydroxyphenyl)propane, 17.0 g (0.05 mol) of 2,2-bis(4-hydroxy3-t-butylphenyl)propane, 0.00244 g ($2\times10^{-4}$ mol per mol of the dihydroxy compound) of 4-dimethylaminopyridine and 21.96 g (0.1025 mol) of diphenyl carbonate having impurity contents given in Table 1 were fed into a reactor and stirred together in a nitrogen atmosphere for 2 hours. The resulting mixture was polycondensed in the same manner as that of Example 1 to give a (co)polycarbonate.

EXAMPLES 5 to 7

Other polycarbonates were prepared through polycondensation in the same manner as that of Example 1 except that other diphenyl carbonates, each having impurity contents given in Table 1, were used instead of the diphenyl carbonate used in Example 1.

Comparative Examples 1 to 4

Other polycarbonates were prepared through polycondensation in the same manner as that of Example 1 except that other diphenyl carbonates, each having impurity contents given in Table 1, were used instead of the diphenyl carbonate used in Example 1.

Comparative Example 5

Another polycarbonate was prepared through polycondensation in the same manner as that of Example 2 except that another diphenyl carbonate having impurity contents given in Table 1 was used instead of the diphenyl carbonate used in Example 2.

The viscosity-average molecular weight (Mv), glass transition point and terminal hydroxyl concentration of each (co)polycarbonate prepared, the hue of each reaction mixture obtained and the YI value of each sheet prepared with each reaction mixture are given in Table 2.

TABLE 1

| Kinds of impurities | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|
| total content of phenyl salicylate, o-phenoxybenzoic acid and phenyl o-phenoxybenzoate (ppm) | 35 | 35 | 35 | 35 | 35 | 41 | 41 | 40 | 40 | 38 | 60 | 38 |
| tin ion content (ppm) | 1 | 1 | 1 | 1 | 1 | 0.9 | 0.9 | 1.5 | 0.8 | 6 | 1 | 6 |

TABLE 1-continued

| Kinds of impurities | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|
| methyl phenyl carbonate content (ppm) | 7 | 7 | 7 | 7 | 8 | 11 | 11 | 5 | 100 | 10 | 8 | 10 |
| chlorine content (ppm) | <0.5 | <0.5 | <0.5 | <0.5 | 4.5 | 3.3 | 4.8 | 6 | <0.5 | <0.5 | <0.5 | <0.5 |
| sodium ion content (ppm) | <0.5 | <0.5 | <0.5 | <0.5 | <0.5 | <0.5 | <0.5 | 0.5 | 0.8 | 0.8 | <0.5 | 0.8 |
| iron ion content (ppm) | <0.1 | <0.1 | <0.1 | <0.1 | <0.1 | <0.1 | <0.1 | 0.5 | 0.5 | 0.5 | <0.1 | 0.5 |
| copper ion content (ppm) | <0.1 | <0.1 | <0.1 | <0.1 | <0.1 | <0.1 | <0.1 | <0.1 | <0.1 | 0.5 | <0.1 | <0.1 |
| phosphorus ion content (ppm) | 13 | 13 | 13 | 13 | 4 | 8 | 8 | 15 | 18 | 15 | 12 | 18 |
| water content (wt %) | 0.21 | 0.21 | 0.21 | 0.21 | 0.22 | 0.19 | 0.19 | 0.27 | 0.20 | 0.25 | 0.23 | 0.20 |

TABLE 2

| | | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|---|
| molecular weight (Mw) | | 29,000 | 27,800 | 27,000 | 24,500 | 26,000 | 27,400 | 28,600 | 24,500 | 26,000 | 19,500 | 26,500 | 23,000 |
| glass transition point (°C.) | | 150 | 151 | 150 | 128 | 152 | 150 | 148 | 145 | 145 | 130 | 148 | 145 |
| terminal hydroxyl concentration (mol %) | | 26 | 21 | 25 | 23 | 28 | 26 | 28 | 28 | 25 | 35 | 40 | 38 |
| hue | | colorless & transparence | colorless & transparence | colorless & transparence | colorless & transparence | colorless & transparence | colorless & transparence | colorless & transparence | pale yellow & transparence | light red & transparence | yellow & transparence | pale yellow & transparence | yellow & transparence |
| stability | YI value (before storage) | 1.2 | 1.1 | 1.4 | 1.2 | 1.3 | 1.4 | 1.5 | 2.6 | 2.1 | 9.5 | 3.0 | 8.7 |
| | YI value (after storage) | 10.0 | 13.7 | 12.1 | 15.9 | 18.1 | 11.9 | 21.6 | 48.4 | 28.0 | 45.0 | 32.1 | 43.0 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A process for preparing a (co)polycarbonate comprising a step of reacting a dihydroxy compound with a carbonic diester, at a molar ratio of 1.01 to 1.5 mol of carbonic diester per mol of dihydroxy compound, by melt-polycondensation in the presence of (a) a nitrogen-containing basic compound and/or (b) an alkali metal compound and/or an alkaline earth metal compound as a catalyst, said carbonic diester containing (1) copper ion in an amount not exceeding 1 ppm and phosphorus ion in an amount not exceeding 20 ppm, (2) water in an amount not exceeding 0.3% by weight, chlorine in an amount not exceeding 5 ppm, sodium ion in an amount not exceeding 1 ppm and iron ion in an amount not exceeding 1 ppm, (3) water in an amount not exceeding 0.3% by weight, chlorine in an amount of from above 3 to 5 ppm, sodium ion in an amount not exceeding 1 ppm and iron ion in an amount not exceeding 1 ppm, (4) water in an amount not exceeding 0.3% by weight, chlorine in an amount of from 3.3 to 5 ppm, sodium ion in an amount not exceeding 1 ppm and iron ion in an amount not exceeding 1 ppm or (5) water in an amount not exceeding 0.3% by weight, chlorine in an amount of from above 4 to 5 ppm, sodium ion in an amount not exceeding 1 and iron ion in an amount not exceeding 1 ppm, and is at least one of (factor-1) substantially free from phenyl salicylate, o-phenoxybenzoic acid and phenyl o-phenoxybenzoate, (factor-2) substantially free from tin ion, or (factor-3) substantially free from methyl phenyl carbonate.

2. The process for the preparation of a (co)polycarbonate as set forth in claim 1, wherein the carbonic diester is at least two factors selected from the group consisting of factor-1, the factor-2 and the factor-3.

3. The process for the preparation of a (co)polycarbonate as set forth in claim 1, wherein the carbonic diester contains copper ion in an amount of 1 ppm or below and phosphorus ion in an amount of 20 ppm or below.

4. The process for the preparation of a (co)polycarbonate as set forth in claim 1, wherein the carbonic diester contains water in an amount of 0.3% by weight or below, chlorine in an amount of 5 ppm or below, sodium ion in an amount of 1 ppm or below and iron ion in an amount of 1 ppm or below.

5. The process for the preparation of a (co)polycarbonate as set forth in claim 1, wherein the carbonic diester contains water in an amount of 0.3% by weight or below, chlorine in an amount of from above 3 to 5 ppm, sodium ion in an amount of 1 ppm or below and iron ion in an amount of 1 ppm or below.

6. The process for the preparation of a (co)polycarbonate as set forth in claim 1, wherein the carbonic diester contains water in an amount of 0.3% by weight or below, chlorine in an amount of from 3.3 to 5 ppm, sodium ion in an amount of 1 ppm or below arid iron ion in an amount of 1 ppm or below.

7. The process for the preparation of a (co)polycarbonate as set forth in claim 1, wherein the carbonic diester contains water in an amount of 0.3% by weight or below, chlorine in an amount of from above 4 to 5 ppm, sodium ion in an amount of 1 ppm or below and iron ion in an amount of 1 ppm or below.

8. The process for the preparation of a (co)polycarbonate as set forth in claim 1, wherein the alkali metal compound and/or the alkaline earth metal compound is(are) a borate(s).

9. The process for the preparation of a (co)polycarbonate as set forth in claim 1, wherein the amount of the nitrogen-containing basic compound used is $10^{-6}$ to $10^{-1}$ mol per mol of the dihydroxy compound, and the total amount of the alkali metal compound and the alkaline earth metal compound used is $10^{-7}$ to $10^{-2}$ mol per mol of the dihydroxy compound.

10. The process for the preparation of a (co)polycarbonate as set forth in claim 1, wherein the formed (co)polycarbonate has a terminal hydroxyl concentration of 3 to 30 mole %.

11. The process for the preparation of a (co)polycarbonate as set forth in claim 1, wherein the dihydroxy compound is a phenolic compound selected from the group consisting of compounds represented by the following general formulae (I) to (IV):

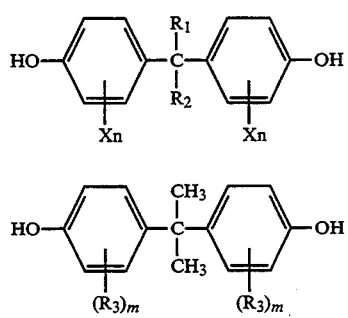

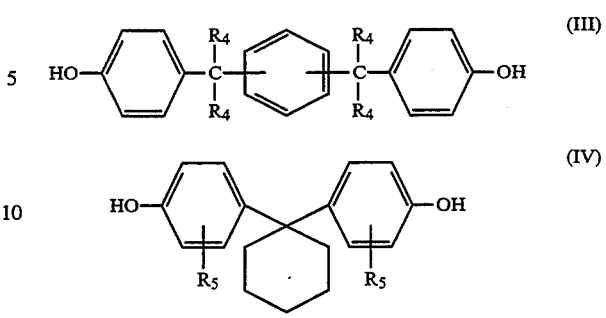

wherein $R_1$, $R_2$, $R_3$, $R_4$ and $R_5$ are each a hydrogen atom, a linear or branched alkyl group having 1 to 8 carbon atoms or a phenyl group; X is a halogen atom; n is 0 or an integer of 1 to 4 and m is an integer of 1 to 4.

12. The process for the preparation of a (co)polycarbonate as set forth in claim 1, wherein two or more dihydroxy compounds and/or two or more carbonic diesters are used to prepare a copolycarbonate.

13. The process for the preparation of a (co)polycarbonate as set forth in claim 1, wherein at least one compound selected from the group consisting of a boric acid, a borate and ammonium hydrogenphosphite is used as an acidic substance in an amount of 0.01 to 500 mol per mol of catalyst.

14. The process for the preparation of a (co)polycarbonate as set forth in claim 1, wherein the boric acid is orthoboric acid.

15. A (co)polycarbonate prepared by the process as set forth in claim 1.

* * * * *

UNITED STATES PATENT AND TRADEMARK OFFICE
CERTIFICATE OF CORRECTION

PATENT NO. : 5,434,235
DATED : July 18, 1995
INVENTOR(S) : Tatsuya KANNO, et al.

It is certified that error appears in the above-indentified patent and that said Letters Patent is hereby corrected as shown below:

```
Column 11, line 62; after "ppm" insert ---,---.
           line 65; after "1" (first occurrence)
                    insert ---ppm---.
Column 12, line 39; delete "the" (both occurrences).
           line 61; change "arid" to ---and---.
```

Signed and Sealed this

Second Day of January, 1996

Attest:

BRUCE LEHMAN

Attesting Officer     Commissioner of Patents and Trademarks